US009792706B2

(12) United States Patent
Kuroda et al.

(10) Patent No.: US 9,792,706 B2
(45) Date of Patent: Oct. 17, 2017

(54) GRAPH PROCESSING SYSTEM, GRAPH PROCESSING METHOD, AND NON-TRANSITORY COMPUTER READABLE MEDIUM

(71) Applicant: Kabushiki Kaisha Toshiba, Minato-ku (JP)

(72) Inventors: Akira Kuroda, Yokohama (JP); Hidenori Matsuzaki, Tokyo (JP); Nobuaki Tojo, Tokyo (JP); Mayuko Koezuka, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 14 days.

(21) Appl. No.: 14/832,169

(22) Filed: Aug. 21, 2015

(65) Prior Publication Data
US 2016/0275707 A1    Sep. 22, 2016

(30) Foreign Application Priority Data
Mar. 19, 2015    (JP) .................................. 2015-056977

(51) Int. Cl.
*G06T 11/20*    (2006.01)
(52) U.S. Cl.
CPC .................................. *G06T 11/206* (2013.01)

(58) Field of Classification Search
None
See application file for complete search history.

(56) References Cited

U.S. PATENT DOCUMENTS

| | | | |
|---|---|---|---|
| 2014/0173504 A1 | 6/2014 | Gup et al. | |
| 2016/0275661 A1* | 9/2016 | Goard | G06T 11/206 |

FOREIGN PATENT DOCUMENTS

| | | |
|---|---|---|
| JP | 03-164969 | 7/1991 |
| JP | 04-337880 | 11/1992 |
| JP | 2009-245128 | 10/2009 |

* cited by examiner

*Primary Examiner* — Edward Martello
(74) *Attorney, Agent, or Firm* — Oblon, McClelland, Maier & Neustadt, L.L.P.

(57) ABSTRACT

According to one embodiment, a graph processing system includes a specifying unit, a decision unit, and a generation unit. The specifying unit specifies a first record set corresponding to a first segment of first elements in graph data including a plurality of records. Each record has a first element and a second element. The decision unit analyzes the first record set on the basis of a predetermined rule, and determines at least one second record set corresponding to a second segment of first elements. The second segment is a part of the first segment. The generation unit generates a segment graph corresponding to the second record set.

10 Claims, 14 Drawing Sheets

GRAPH DATA

| RECORD | | |
|---|---|---|
| 1 | 1200 | 30 |
| 2 | 539 | 25 |
| 3 | 542 | 16 |
| 4 | 1815 | 13 |
| 5 | 442 | 19 |
| ⋮ | ⋮ | ⋮ |
| 58 | 1180 | 4 |
| 59 | 1218 | 6 |
| 60 | 699 | 1555 |
| 61 | 22 | 1821 |
| 62 | 1640 | 29 |
| ⋮ | ⋮ | ⋮ |
| 66 | 1601 | 1592 |
| 67 | 929 | 219 |
| 68 | 356 | 1232 |
| 69 | 728 | 1103 |
| 70 | 1299 | 633 |
| ⋮ | ⋮ | ⋮ |

TIME SERIES-PARAMETER

THE NUMBER OF ACCESSES-PARAMETER

THE NUMBER-PARAMETER

FIRST ELEMENT (ATTRIBUTE: TIME)

SECOND ELEMENT (ATTRIBUTE: THE NUMBER OF ACCESSES)

THIRD ELEMENT (ATTRIBUTE: THE NUMBER)

FIG. 13

GRAPH PROCESSING SYSTEM, GRAPH PROCESSING METHOD, AND NON-TRANSITORY COMPUTER READABLE MEDIUM

CROSS-REFERENCE TO RELATED APPLICATION

This application is based upon and claims the benefit of priority from Japanese Patent Application No. 2015-056977, filed on Mar. 19, 2015; the entire contents of which are incorporated herein by reference.

FIELD

Embodiments described herein relate generally to a graph processing system, a graph processing method, and a non-transitory computer readable medium.

BACKGROUND

In order to visually represent a feature and a tendency of numerical data, in general, a graph displaying device is widely used. In the graph displaying device, a graph is created based on the numerical data, and the graph is displayed on a display screen. In this case, a user can variously indicate a range of the numerical data and a shape of a graph used for creating the graph.

Furthermore, recently, in various technical regions, research and development is performed by putting big data to practical use. In this practical use of big data, graph-creating by analyzing the numerical data is extremely important, and widely desired.

A data amount handled by processing the big data is enormous. Accordingly, when a graph based on the numerical data is displayed, the user often wants to indicate a segment of specific numerical data, in order to display a graph in the segment.

However, in the segment of numerical values to be displayed as a graph, if a value (outlier) largely shifted from other values is included, the user cannot understand variation of graph of the other values (except for the outlier). Namely, it is hard for the user to view the graph.

BRIEF DESCRIPTION OF THE DRAWINGS

FIG. 13 is one example of graph data stored in a storage unit 220 of the graph processing system 50.

DETAILED DESCRIPTION

According to one embodiment, a graph processing system includes a specifying unit, a decision unit, and a generation unit. The specifying unit specifies a first record set corresponding to a first segment of first elements in graph data including a plurality of records. Each record has a first element and a second element. The decision unit analyzes the first record set on the basis of a predetermined rule, and determines at least one second record set corresponding to a second segment of first elements. The second segment is apart of the first segment. The generation unit generates a segment graph corresponding to the second record set.

Various embodiments will be described hereinafter with reference to the accompanying drawings.

The First Embodiment

In a graph processing system 1 according to the first embodiment, based on stored graph data (such as numerical data, character string data), a graph can be created and displayed. For example, the graph processing system is suitable for analyzing big data and displaying a graph which visualizes the analysis result.

As to the graph processing system 1, in a graph (it is called "initial graph") previously displayed, an indication of a segment (it is called "selection segment") on which a user wants to focus is accepted from the user.

In the graph processing system 1, graph data corresponding to the indicated selection segment is analyzed. When this graph data is displayed as a final graph (it is called "segment graph"), graph data used for the segment graph is determined so as not to display crushed parts influenced by the range.

In a graph display device of conventional technique, a range of the graph is adjusted so as to include both a maximum and a minimum in graph data to be displayed. Accordingly, if an outlier exists in the graph data, a graph of a segment except for the outlier is displayed with crushed. Here, the outlier is a value largely shifted from other values in graph data of the indicated segment.

In the graph processing system 1 of the first embodiment, different from the conventional technique, graph data used for a segment graph is determined so as not to display crushed parts influenced by the range. Accordingly, a graph easy for the user to view can be displayed.

Figure 1:
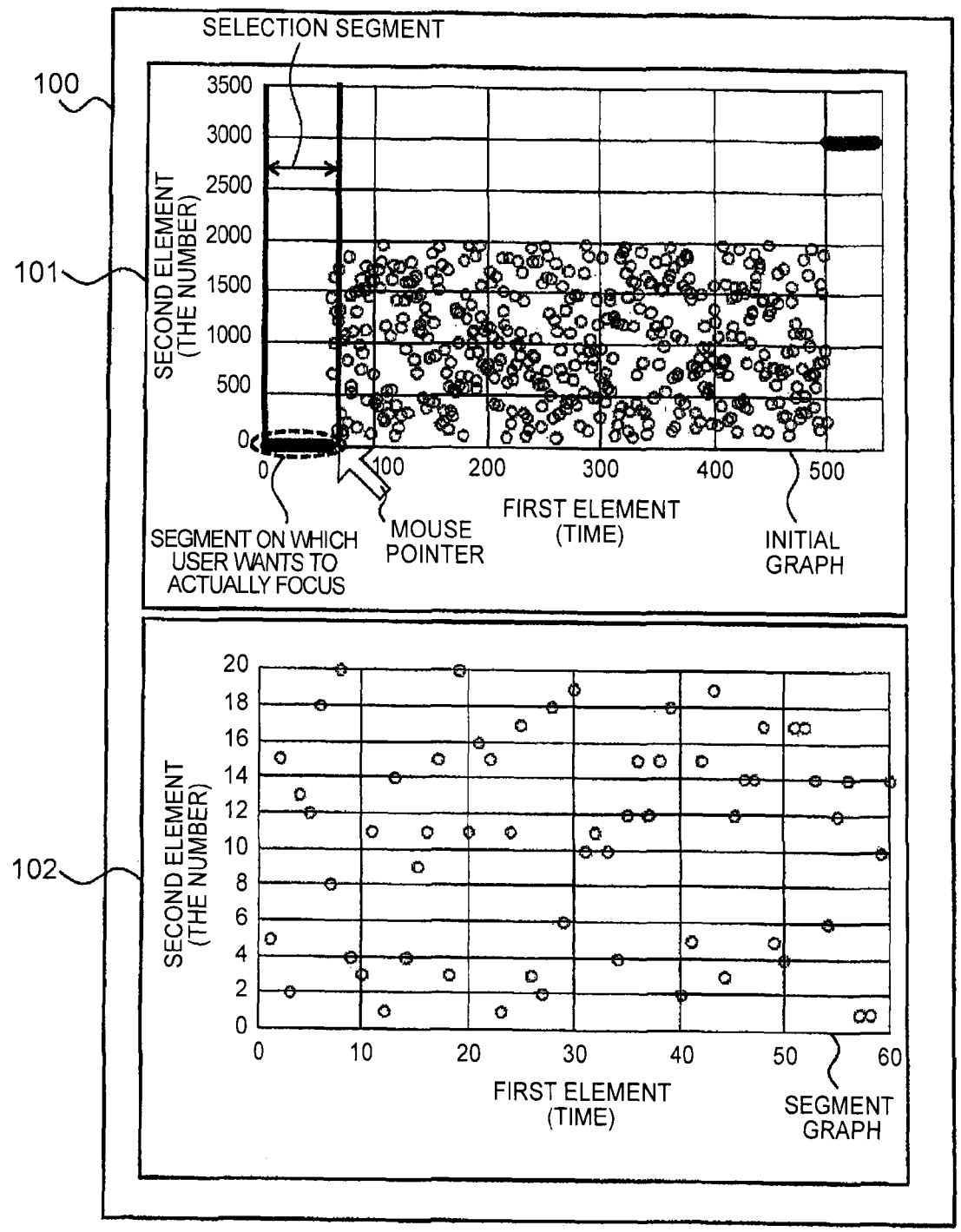
FIG. 1 is one example showing a display screen 100 of a graph processing system 1 according to a first embodiment.

FIG. 1 is one example showing a display screen 100 of the graph processing system 1 according to the first embodiment. In the graph processing system 1, a first display screen 101 and a second display screen 102 are displayed on the display screen 100. The first display screen 101 and the second display screen 102 may be located at any position of the display screen 100.

The first display screen 101 displays an initial graph based on some graph data. The second display screen 102 displays a segment graph. In each graph, a horizontal axis represents a first element in graph data, and a vertical axis represents a second element in the graph data (detail will be explained afterwards).

In the first embodiment, in the initial graph displayed on the first display screen 101, a user may indicate a selection segment by using a mouse pointer and so on.

Figure 2:
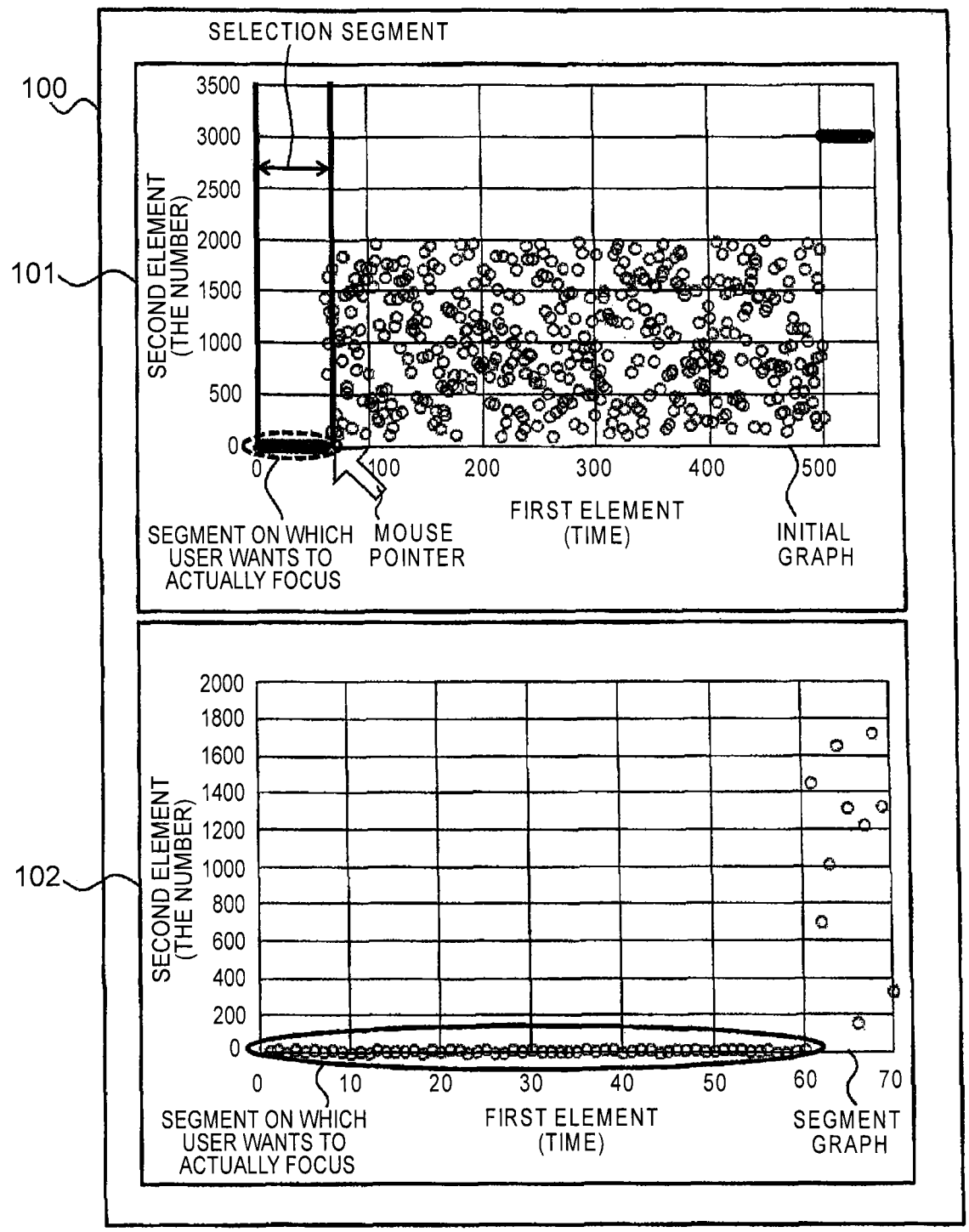
FIG. 2 is one example showing a segment graph according to conventional technique.

Here, when the initial graph including a large number of graph data is displayed on the first display screen 101, it is difficult for the user to accurately indicate a segment of graph data to be focused on, as a selection segment. FIG. 2 is one example of a segment graph displayed by the conventional graph display device. In this case, if an outlier is included in the selection segment, a graph except for the outlier is crushed, and the segment graph shown in FIG. 2 is displayed.

In the graph processing system 1 of the first embodiment, if an outlier exists in graph data of the selection segment, a segment graph is corrected so that a segment crushed by influence of range is not displayed, and the corrected segment graph is displayed.

The graph described in the first embodiment may be any graph can be created from graph data, for example, a scatter diagram, a pie graph, a bar graph, a line graph, an area graph, a Gantt chart, a box plot, a table, a correlation diagram, a heat map, a tree chart, a matrix map.

Figure 3:
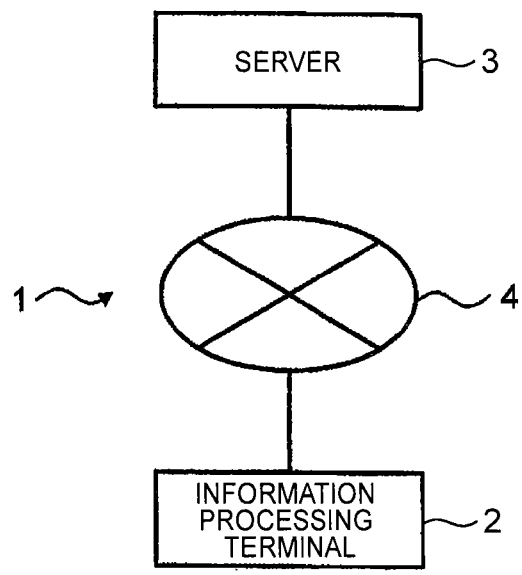
FIG. 3 is a block diagram of the graph processing system 1.

FIG. 3 is a block diagram of the graph processing system 1. The graph processing system 1 includes an information processing terminal 2 and a server 3. The information processing terminal 2 and the server 3 are connected via a network 4 such as Internet.

The information processing terminal 2 is a device operable by a user, for example, a personal computer (PC), a tablet PC, or a smart phone. The server 3 performs at least one part of processing to create a graph displayed on the information processing terminal 2. In FIG. 3, the information processing terminal 2 and the server 3 are respectively drawn as one unit. However, the information processing terminal 2 and the server 3 may be respectively a plurality of units.

Figure 4:
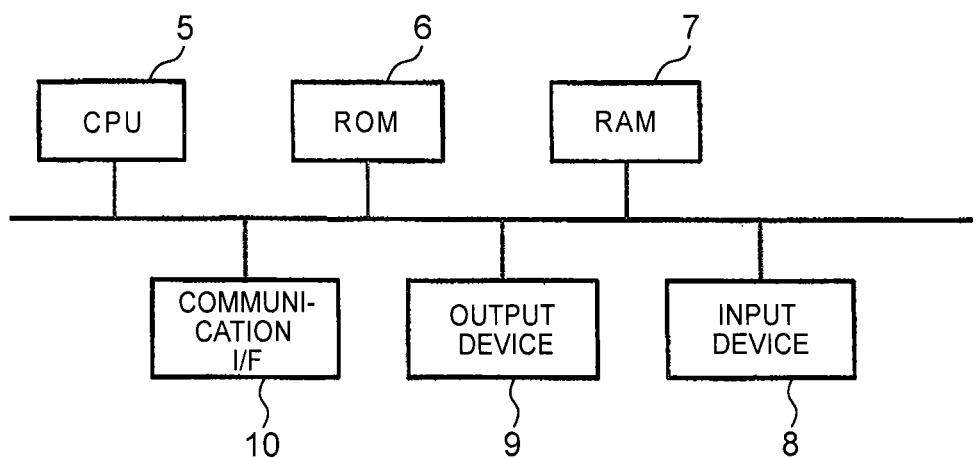
FIG. 4 is a hardware component of an information processing terminal 2 and a server 3 in the information processing system 1.

FIG. 4 is one example of hardware component of the information processing terminal 2 and the server 3. The information processing terminal 2 and the server 3 includes component used for regular computer, i.e., a CPU (Central Processing Unit) 5, a ROM (Read Only Memory) 6, a RAM (Random Access Memory) 7, an input device 8, an output device 9, and a communication I/F 10. The CPU 5 performs predetermined operation processing according to control program stored in the ROM 6, by using the RAM 7 as working area. The input device 8 is a device to input information from the outside, for example, a keyboard, a mouse, or a touch panel. The output device 9 is a device to output information created at the inside to the outside, for example, a display. The communication I/F 10 is a device able to send/receive information with an external device via the network 4.

Figure 5:
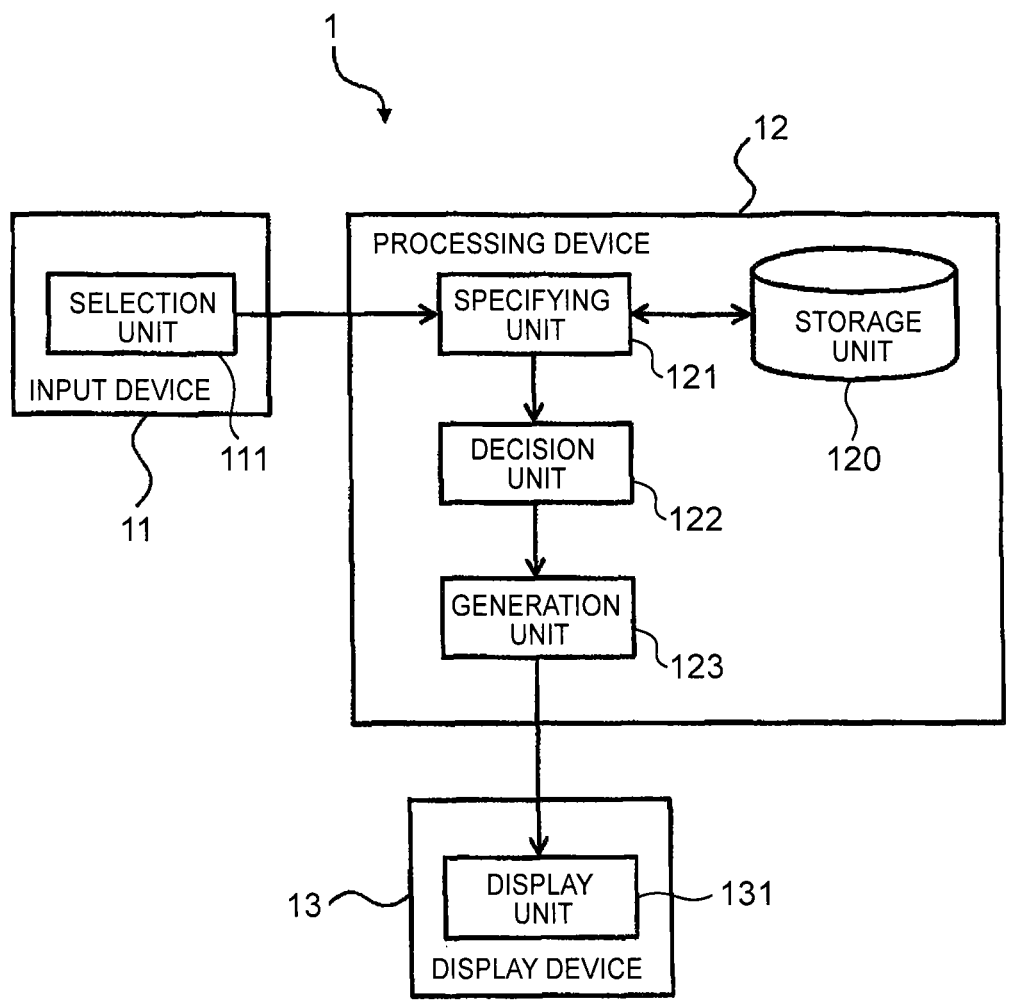
FIG. 5 is a schematic diagram of functional blocks of the graph processing system 1.

FIG. 5 is a functional block diagram of the graph processing system 1. The graph processing system 1 includes an input device 11, a processing device 12, and a display device 13. The input device 11 includes a selection unit 111. The processing device 12 includes a storage unit 120, a specifying unit 121, a decision unit 122, and a generation unit 123. The display device 13 includes a display unit 131.

For example, the information processing terminal 2 may include the input device 11 and the display device 13. The server 3 may include the processing device 12.

Figure 6:
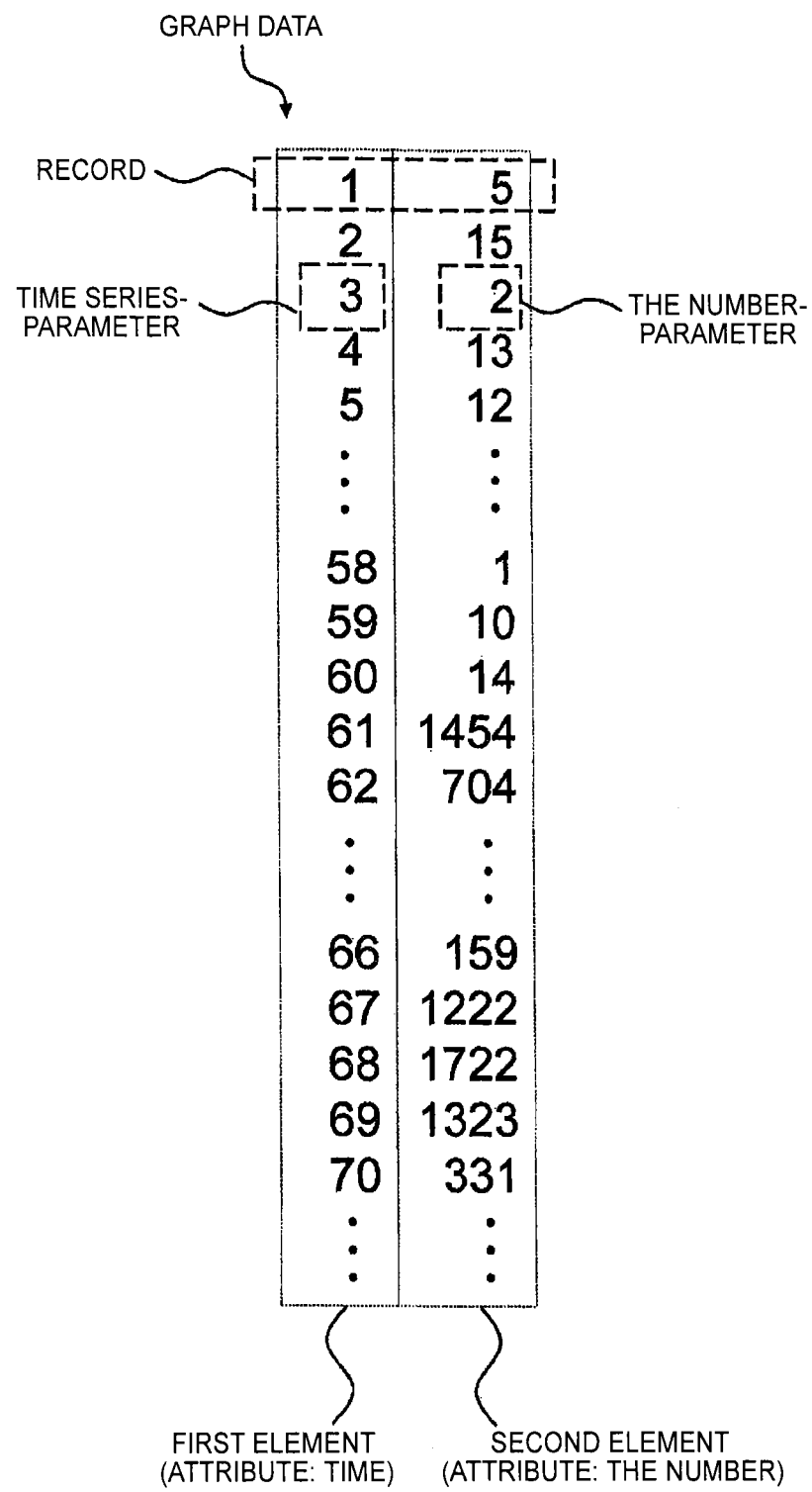
FIG. 6 is one example of graph data stored in a storage unit 120 of the graph processing system 1.

The storage unit 120 stores graph data used for the initial graph and the segment graph. FIG. 6 is one example showing graph data stored in the storage unit 120. The storage unit 120 stores graph data in which a first element and a second element are corresponded. For example, if the graph data represents time series-change of sales number of some commodity, the first element may include a plurality of time series-parameters of which attribute is time. The second element may include a plurality of the number-parameters of which attribute is the number. Namely, each element includes a plurality of parameters having common attribute.

In the first embodiment, a pair of one time series-parameter and the number-parameter corresponding thereto is called a record. In FIG. 6, a pair of a time series-parameter "1" and the number-parameter "5" corresponding thereto is one record. Namely, in the first embodiment, graph data is represented as a set of records.

The selection unit 111 selects a selection segment of arbitrary first element in the initial graph by the user's operation.

The specifying unit 121 extracts graph data stored in the storage unit 120, and specifies a set of records included in the selection segment as a first record set.

The decision unit 122 analyzes the first record set, and determines a second record set corresponding to a segment (it is called "display segment") to be displayed as a segment graph according to a predetermined rule.

The generation unit 123 generates a segment graph corresponding to the second record set.

The display unit 131 displays the segment graph.

The above is explanation of component of the graph processing system 1.

Figure 7:
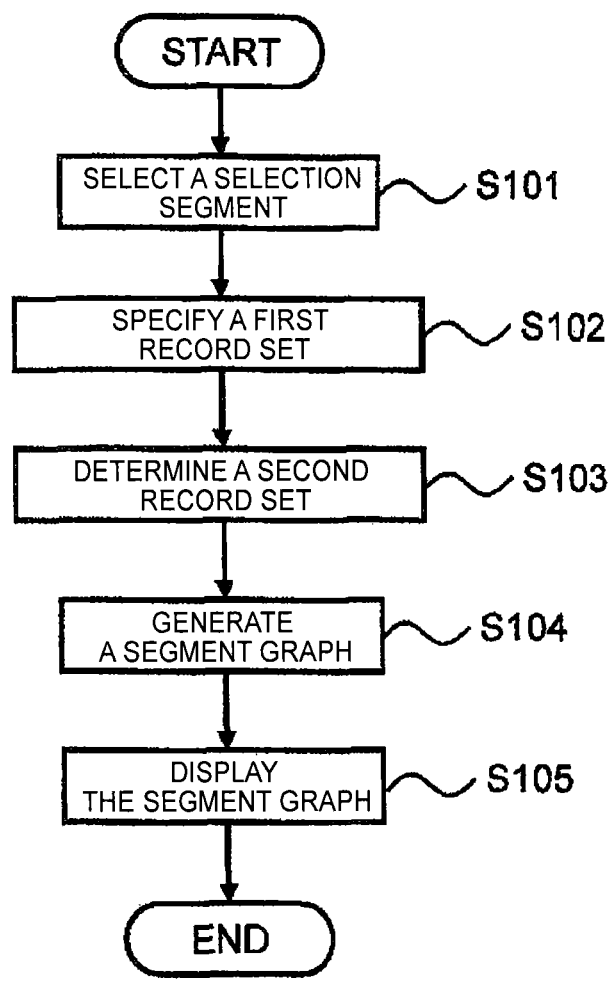
FIG. 7 is a flow chart of processing of the graph processing system 1.

FIG. 7 is a flow chart of processing of the graph processing system 1. At S101, the selection unit 111 selects a selection segment in the initial graph by a user's operation (S101).

For example, as shown in FIG. 1, in the initial graph displayed on the first display screen 101, the user may select a selection segment by using a mouse pointer. In the first embodiment, in the initial graph, a segment of which the first element is "1"~"70" is selected as a selection segment.

At S102, the specifying unit 121 extracts graph data stored in the storage unit 120, and specifies a first record set corresponding to the selection segment (S102). In this example, in the graph data extracted, the specifying unit 121 specifies records of which the first element is "1"~"70" as a first record set.

At S103, the decision unit 122 analyzes the first record set, and determines a second record set corresponding to the display segment according to a predetermined rule (S103).

Namely, the decision unit 122 analyzes the first record set according to a predetermined rule. If the first record set is displayed as a segment graph, the decision unit 122 decides whether crushed parts influenced by range are displayed in the segment graph. In the first embodiment, if it is decided that at least one crushed part is displayed, the decision unit 122 divides the first record set into a group corresponding to segments where crushed parts are displayed and a group corresponding to other segments. The decision unit 122 determines a group in which the number of records is the largest as a second record set.

In this case, for example, among each record of the first record set, the decision unit 122 calculates a difference between two second elements adjacently positioned in alignment (arrangement) order of the first element. In example of FIG. 6, among records (the first element is "1"~"70") of the first record set, the decision unit 122 calculates a difference (=10) between two second elements ("5" and "15") corresponding to two first elements "1" and "2", a difference (=13) between two second elements ("15" and "2") corresponding to two first elements "2" and "3", . . . , a difference (=992) between two second elements ("1323" and "331") corresponding to two first elements "69" and "70". Here, in this example, the difference is calculated as an absolute value.

The decision unit 122 divides the first record set into each group having records of which differences (between two second elements adjacently positioned in alignment order of the first element) are continuously below a predetermined threshold. Among each group, the decision unit 122 determines a group of which the number of records is the largest, as a second record set. The predetermined threshold may be previously determined.

For example, if the predetermined threshold is "1200", in example of FIG. 6, the decision unit 122 divides the first record set into a group A having the first elements "1"~"60", and a group B having the first elements "61"~"70". Among each group, the decision unit 122 determines the group A of which the number of records is the largest, as a second record set.

Here, if the difference is not calculated as an absolute value, the decision unit 122 divides the first record set into each group having records of which differences (between two second elements adjacently positioned in alignment order of the first element) are continuously within predetermined maximum and minimum thresholds. Among each group, the decision unit 122 determines a group of which the number of records is the largest, as a second record set.

At S104, the generation unit 123 generates a segment graph (corresponding to the second record set) of which axes are the first element and the second element (S104). In example of FIG. 6, the second record set is the group A having the first elements "1"~"60". Accordingly, the generation unit 123 generates a segment graph corresponding to the group A. Here, by conventional technique, the generation unit 123 may adjust a range of the segment graph so as to include data having maximum and data having minimum in the second record set.

At S105, the display unit 131 displays the segment graph (S105). In this example, the display unit 131 displays a segment graph shown in lower part of FIG. 1.

The above is explanation of processing of the graph processing system 1.

In this way, in the graph processing system of the first embodiment, in the initial graph, a first record set corresponding to the selection segment (indicated by the user) is analyzed. By using above-mentioned method, a segment graph is generated from a second record set having a part of segments of the first record set. As a result, the segment graph is displayed without crushing a segment for the user to actually focus on.

The First Modification

At S103 of FIG. 7, if crushed parts exist in displayed segment graph of the first record set, the decision unit 122 divides the first record set into a group corresponding to segments where crushed parts are displayed and a group corresponding to other segments, and determines a group in which the number of records is the largest as a second record set. However, the division processing is not limited to this method.

In the first modification, the decision unit 122 divides the first record set into each group having records of which differences (between two second elements adjacently positioned in alignment order of the first element) are continuously below a predetermined threshold. The decision unit 122 determines each group as a second record set respectively. Namely, in example of FIG. 6, the group A having the first element "1"~"60" and the group B having the first element "61"~"70" are set to the second record set respectively.

In this case, at S104, the generation unit 123 generates a segment graph corresponding to each second record set. At S105, the display unit 131 displays each segment graph. Here, by conventional technique, the generation unit 123 adjusts a range of each segment graph so as to include data having maximum and data having minimum.

Figure 8:
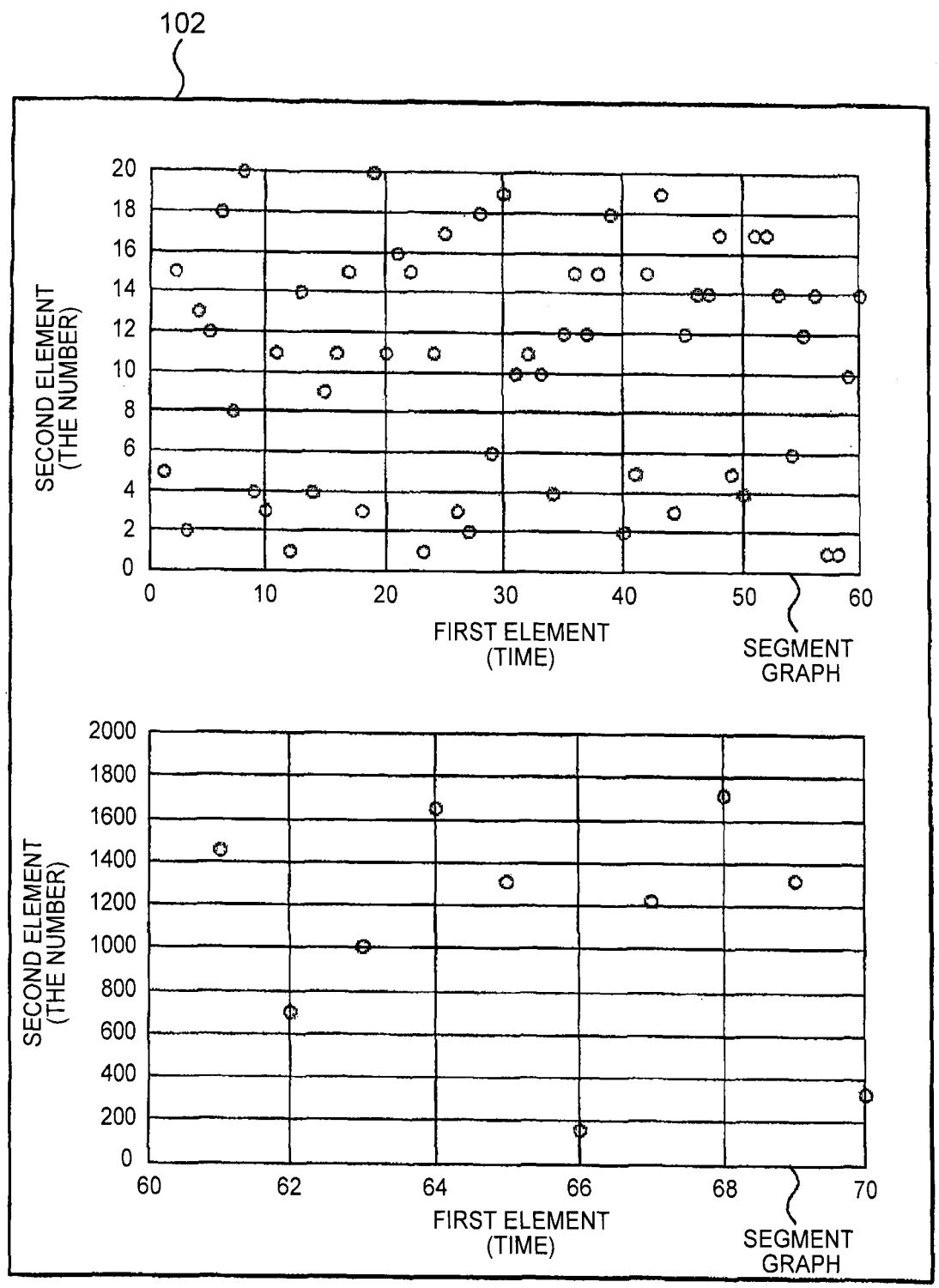
FIG. 8 is one example of a segment graph displayed according to a first modification of the first embodiment.

FIG. 8 is one example of the segment graph displayed according to the first modification. In FIG. 8, a second display screen 102 is only shown.

As shown in FIG. 8, in the first modification, by displaying the segment graph using above-mentioned method, a segment for the user to actually focus on is displayed without crushing.

The Second Modification

According to a predetermined rule except for above-mentioned method, the decision unit 122 may determine the second record set from the first record set. For example, based on an average or a standard deviation of the first elements of records included in the first record set, the predetermined rule may be determined. Furthermore, based on Smirnov-Grubbs test or Thompson test (already known), the predetermined rule may be determined.

The Third Modification

Figure 9:
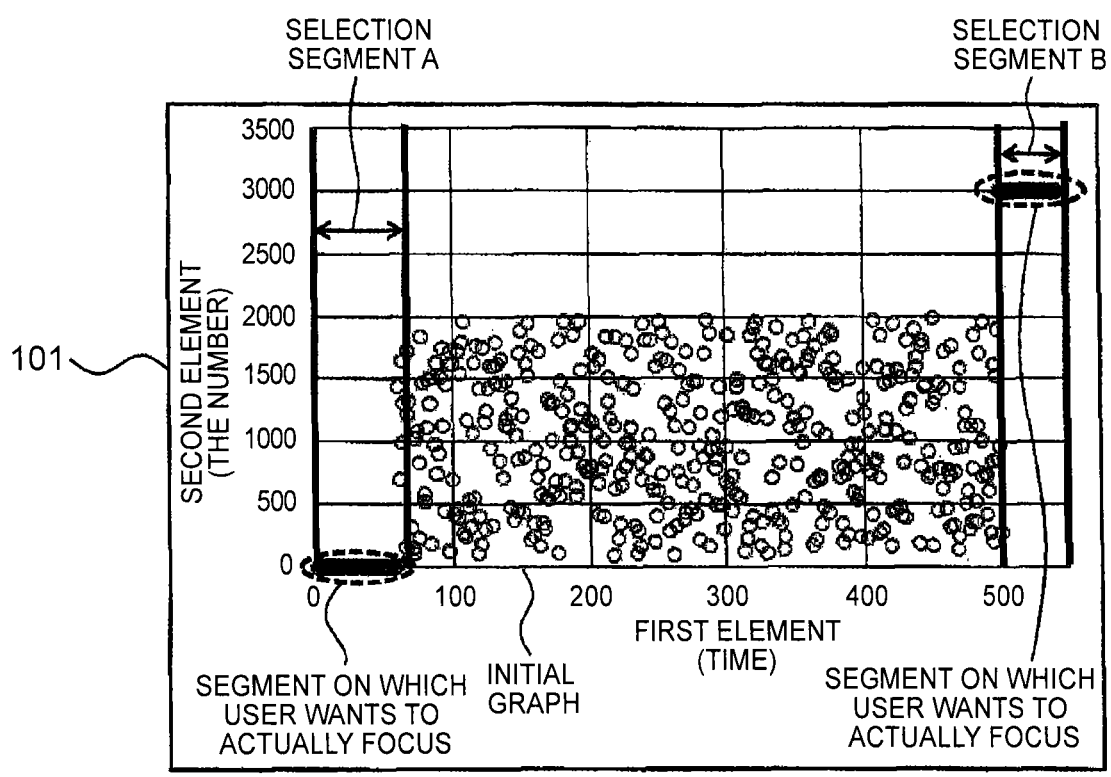
FIG. 9 is one example of a first display screen 101 according to a third modification of the first embodiment.

In the first embodiment, the selection unit 111 selects one selection segment in the initial graph. However, a plurality of selection segments may be selected. FIG. 9 is one example showing a first display screen 101 according to the third modification.

In the third modification, the selection unit 111 selects two selection segments (a segment A and a segment B in FIG. 9) in the initial graph by the user's operation.

Here, in the graph processing system 1 of the third modification, processing from S102 to S105 is executed for each selection segment.

Figure 10:
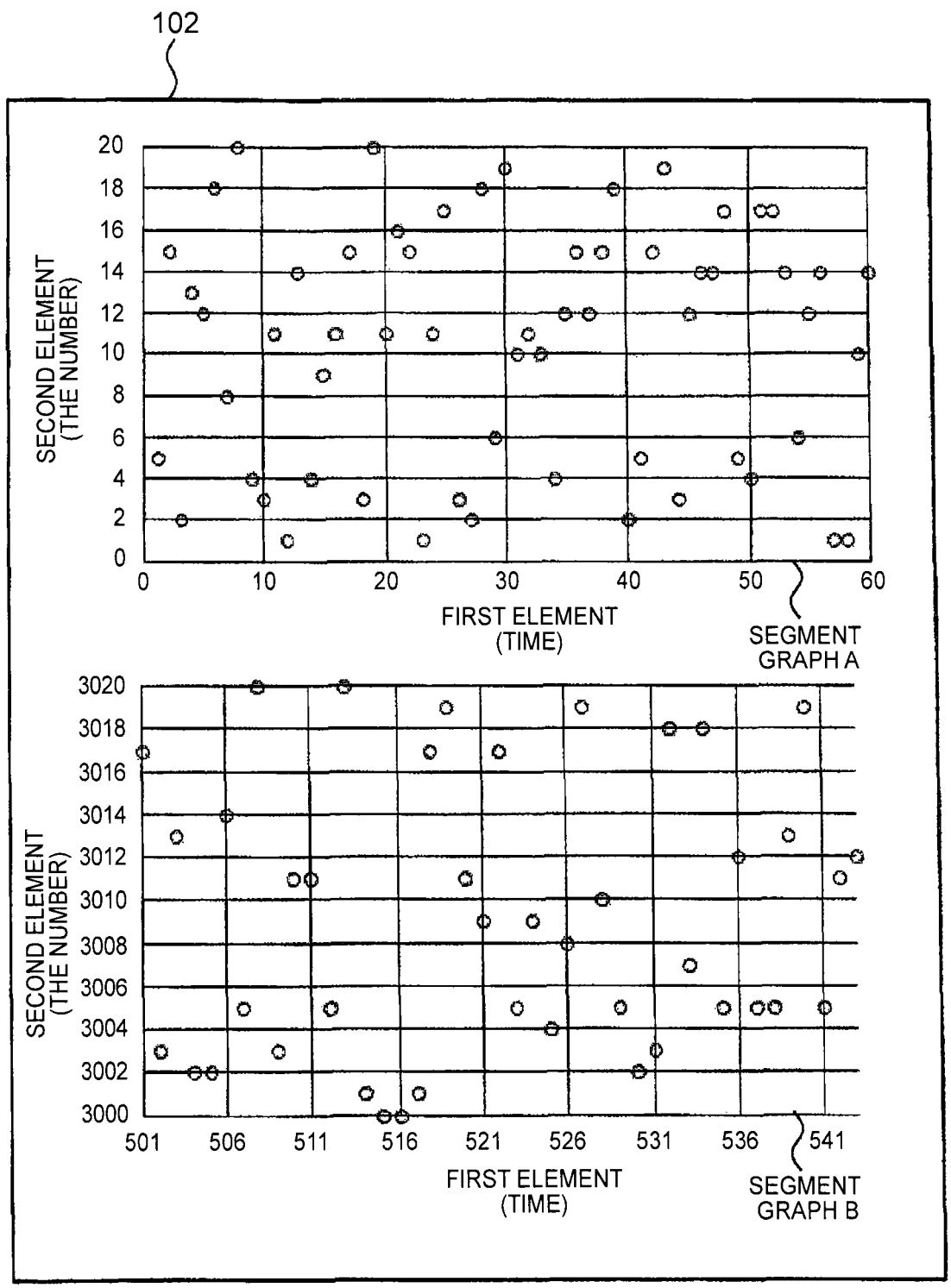
FIG. 10 is one example of a second display screen 102 according to the third modification of the first embodiment.

FIG. 10 is one example showing a second display screen 102 according to the third modification. In the third modification, the display unit 131 displays a segment graph A corresponding to the selection segment A and a segment graph B corresponding to the selection segment B on the second display screen 102 respectively.

The Fourth Modification

In the first embodiment, the selection unit 111 selects a selection segment of the first element in the initial graph by the user's operation. However, a plurality of selection segments of the second element may be selected. Here, in the fourth modification, the specifying unit 121 extracts graph data stored in the storage unit 120, and specifies records included in both the selection segment of the first element and the selection segment of the second segment, as a first record set. Following processing from this specifying process is same as the first embodiment.

The above is explanation of the first embodiment.

The Second Embodiment

In the first embodiment, the case that each record included in graph data has two elements (the first element and the second element) was explained.

Figure 11:
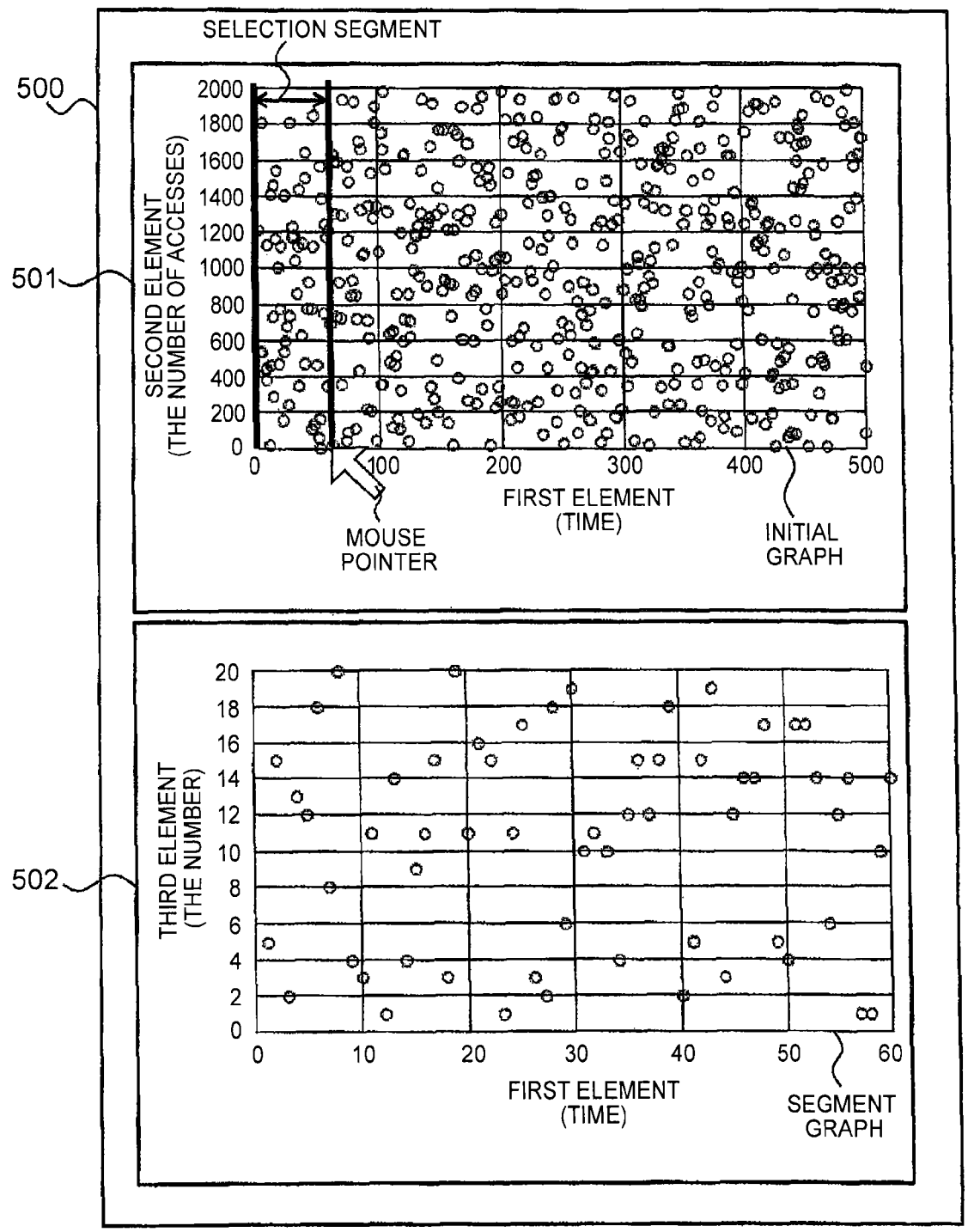
FIG. 11 is one example showing a display screen 500 of a graph processing system 50 according to a second embodiment.

FIG. 11 is one example showing a display screen 500 of a graph processing system 50 according to the second embodiment. In the second embodiment, as to the case that each record included in graph data has three elements (the first element, the second element, and a third element), from the initial graph of which axes are the first element and the second element, a segment graph of which axes are the first element and the third element is generated.

For example, as to an electronic commerce site which treats specific commodity on Internet, when a user selects arbitrary selection segment in the initial graph representing a time series-change of the number of access times to this site, a segment graph representing time series-change of sales number of commodity corresponding to this selection segment is displayed. The second embodiment is suitable for this case.

Figure 12:
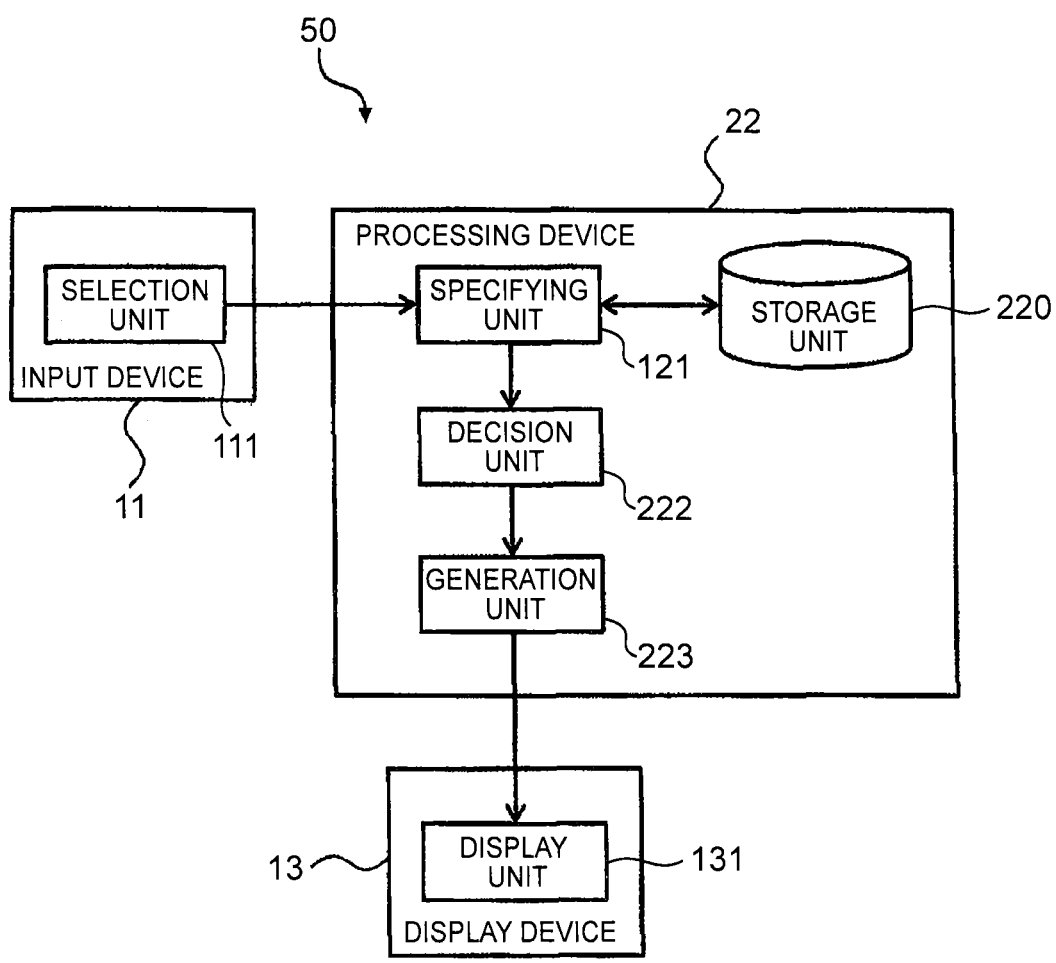
FIG. 12 is a schematic diagram of functional blocks of the graph processing system 50.

FIG. 12 is a functional block diagram of the graph processing system 50. In the graph processing system 50, in comparison with the graph processing system 1, the processing device 12 is replaced with a processing device 22, the storage unit 120 is replaced with a storage unit 220, the decision unit 122 is replaced with a decision unit 222, and the generation unit 123 is replaced with a generation unit 223.

FIG. 13 is one example of graph data stored in the storage unit 220 according to the second embodiment. The storage unit 220 stores graph data in which the first element, the second element and the third element are corresponded. In an example of the second embodiment, as the first element, a plurality of time series-parameters of which attribute is time is included. As the second element, a plurality of the number of accesses-parameters of which attribute is the number of access times is included. As the third element, a plurality of the number-parameters of which attribute is the number is included. Namely, in the second embodiment, each record includes parameters of the first element, the second element and the third element.

In FIG. 11, the initial graph is a graph of which horizontal axis is the first element and vertical axis is the second element. The segment graph is a graph of which horizontal axis is the first element and vertical axis is the third element.

Processing of the graph processing system 50 will be explained. A flow chart of processing of the graph processing system 50 is same as the flow chart of the first embodiment shown in FIG. 7.

The selection unit 111 performs same processing of the first embodiment. In the second embodiment, in the initial graph, a segment of which the first element is "1"~"70" is selected as a selection segment.

The specifying unit 121 extracts graph data stored in the storage unit 220, and specifies a first record set corresponding to the selection segment. In this example, among the graph data extracted, the specifying unit 121 specifies records having the first element "1"~"70" as a first record set.

The decision unit 222 analyzes the first record set, and determines a second record set corresponding to a display segment according to a predetermined rule. In the second embodiment, among each record of the first record set, the decision unit 222 calculates a difference between two third elements adjacently positioned in alignment (arrangement) order of the first element. The decision unit 222 divides the first record set into each group having records of which differences (between two third elements adjacently positioned in alignment order of the first element) are continuously below a predetermined threshold. Among each group, the decision unit 222 determines a group of which the number of records is the largest, as a second record set.

The generation unit 223 generates a segment graph (corresponding to the second record set) of which axes are the first element and the third element. The display unit 131 displays the segment graph generated.

The above is explanation of processing of the graph processing system 50.

The First Modification

The first, second, third and fourth modifications of the first embodiment can be applied to the second embodiment. For example, as the fourth modification of the first embodiment, in the initial graph of FIG. 11, the selection unit 111 may select "1"~"70" as a selection segment of the first element and "1"~"1000" as a selection segment of the second element by the user's indication. In this case, the specifying unit 221 extracts graph data stored in the storage unit 220, and specifies records included in both the selection segment of the first element and the selection segment of the second element as a first record set.

Furthermore, if a second record set is determined, in the same way as the first modification of the first embodiment, the first record set is divided into each group having records of which differences (between two third elements adjacently positioned in alignment order of the first element) are continuously below a predetermined threshold. Each group is determined as a second record set respectively.

Figure 14:
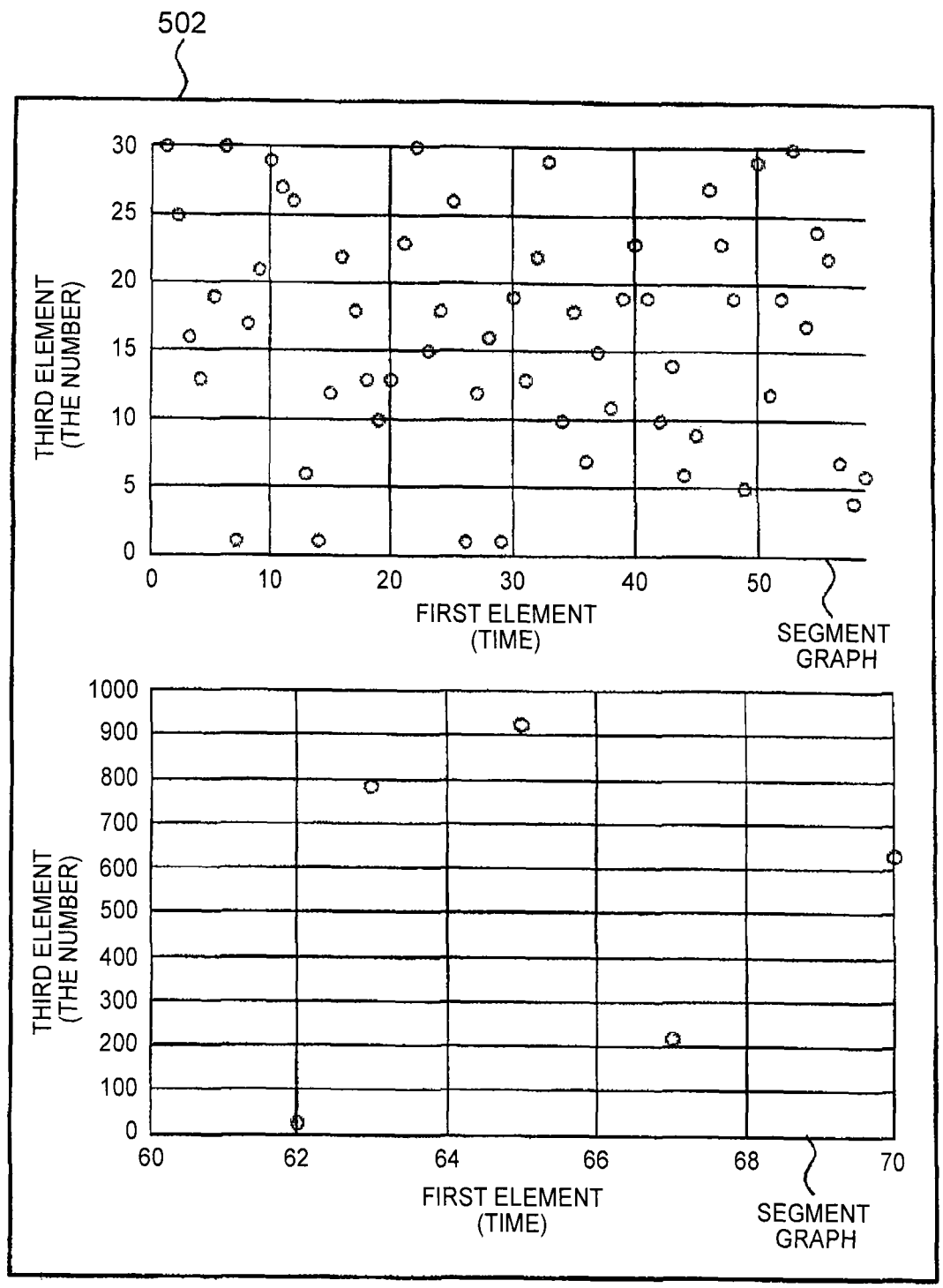
FIG. 14 is one example of a segment graph displayed according to a first modification of the second embodiment.

FIG. 14 is one example showing a segment graph displayed by the display unit 131 according to the first modification. In FIG. 14, the second display screen 502 is only shown. As shown in FIG. 14, in the first embodiment, by displaying the segment graph generated by above-mentioned method, a segment on which the user actually wants to focus is displayed without crushing.

The Second Modification

In the second embodiment, the case that the number of elements of each record included in graph data is three (the first element~the third element) was explained. However, the number of elements of each record is larger than or equal to four. For example, following case is imagined. In the initial graph, a horizontal axis is the first element and a vertical axis is the second element. In the segment graph, a horizontal axis is the third element and a vertical axis is the fourth element.

In this case, among each record of the first record set, the decision unit 222 calculates a difference between two fourth elements adjacently positioned in alignment (arrangement) order of the third element corresponding to the horizontal axis of the segment graph. The decision unit 222 divides the first record set into each group having records of which differences (between two fourth elements adjacently positioned in alignment order of the third element) are continuously below a predetermined threshold. Among each group, the decision unit 222 determines a group of which the number of records is the largest, as a second record set.

The above is explanation of the second element.

The Third Embodiment

As to the graph data of the first embodiment, data representing time series-transition of the sales number of some commodity was explained as an example. As to the graph data of the second embodiment, in an electronic commerce site that handles specific commodities on Internet, the sales number of the commodities and the number of access times in this site were explained as an example. However, the graph data are not limited to these examples.

The graph data handled by the graph processing system 60 of the third embodiment are related to the execution result of software. Namely, each element of the graph data of the third embodiment is related to the execution of software program. For example, each element may be numerically represented such as the number of loop rotations, the number of calling times of function, the number of execution times of specific part of program, the number of execution times of hardware module, the number of execution cycles, the number of times of data access, the number of times of data writing access, the number of times of data reading access, the number of times of array access, the number of times of array writing access, the number of times of array reading access, the number of times of structure access, the number of times of structure writing access, the number of times of structure reading access, a value of variable, a value of array element, a value of structure element, the number of times of memory access, the number of times of memory writing access, the number of times of memory reading access, an elapsed time of processing, or a memory address. Furthermore, each element may be an ID specifying a part of software program such as a function name, line information of software program, or a hardware module name.

Figure 15:
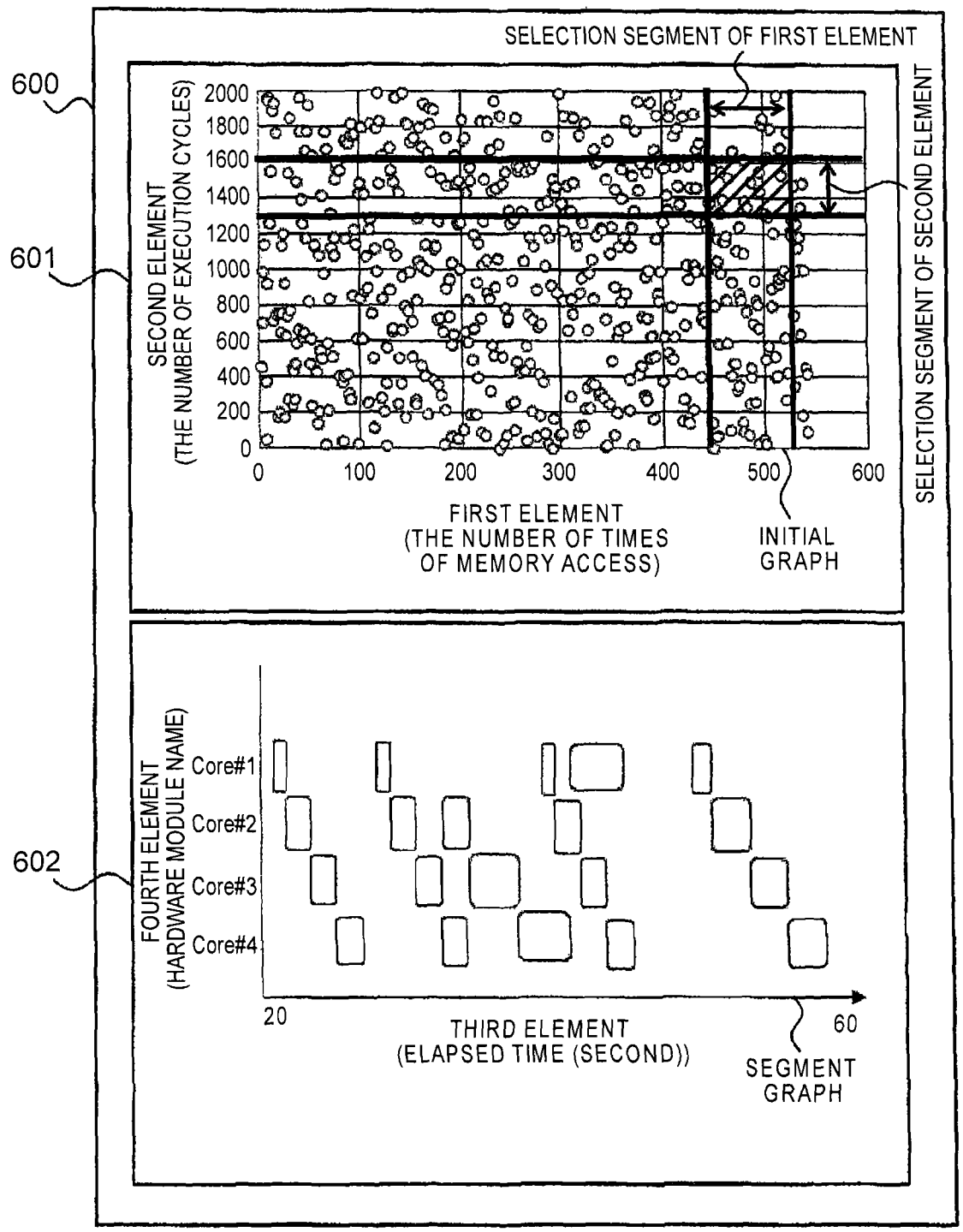
FIG. 15 is one example showing a display screen 600 of a graph processing system 60 according to a third embodiment.

FIG. 15 is one example showing a display screen 600 of the graph processing system according to the third embodiment. In the initial graph of FIG. 15, the first element is the number of times of memory access, and the second element is the number of execution cycles. When a selection segment of each element is selected, a segment graph (Gantt chart) of which the third element is an elapsed time and the fourth element is a hardware module name is displayed. In this case, processing of the graph processing system 60 is same as that of the second embodiment.

The above is explanation of the third embodiment.

According to above-mentioned embodiments, a graph easy for the user to view can be displayed.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operating system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system for processing a graph, comprising: circuitry configured to
    specify a first record set corresponding to a first segment of first elements in graph data including a plurality of records, each record having a first element and a second element,
    analyze the first record set on the basis of a predetermined rule, and determine at least one second record set corresponding to a second segment of first elements, the second segment being a part of the first segment,
    generate a segment graph corresponding to the second record set,
    wherein a range of an axis for the second element in the segment graph is determined based on second elements of the second record set and adjusted so as to include a maximum and a minimum among the second elements of the second record set.

2. The system according to claim 1, wherein the circuitry
    divides the first record set into a plurality of groups each of which a difference between two second elements adjacently positioned in alignment order of the first element continuously satisfies a predetermined condition, and
    determines at least one of the groups as the second record set.

3. The system according to claim 2, wherein the circuitry determines one group of which the number of records is the largest among the groups, as the second record set.

4. The system according to claim 2, wherein the circuitry determines each of the groups as the second record set.

5. The system according to claim 1, further comprising: a display device that displays the segment graph.

6. The system according to claim 1, wherein
the circuitry is configured to generate an initial graph having the graph data including the plurality of records from which the first record set is specified, and
the segment graph is different from the initial graph.

7. A method for processing a graph, comprising:
specifying, via processing circuitry, a first record set corresponding to a first segment of first elements in graph data including a plurality of records, each record having a first element and a second element;
analyzing, via the processing circuitry, the specified first record set;
determining, via the processing circuitry, at least one second record set corresponding to a second segment of first elements, the second segment being a part of the first segment; and
generating, via the processing circuitry, a segment graph corresponding to the second record set,
wherein a range of an axis for the second element in the segment graph is determined based on second elements of the second record set and adjusted so as to include a maximum and a minimum among the second elements of the second record set.

8. The method according to claim 7, wherein
the circuitry is configured to generate an initial graph having the graph data including the plurality of records from which the first record set is specified, and
the segment graph is different from the initial graph.

9. A non-transitory computer readable medium storing computer readable instructions thereon which, when executed by a computer, cause the computer to perform a method for processing a graph, the method comprising:
specifying, via processing circuitry of the computer, a first record set corresponding to a first segment of first elements in graph data including a plurality of records, each record having a first element and a second element;
analyzing, via the processing circuitry, the specified first record set;
determining, via the processing circuitry, at least one second record set corresponding to a second segment of first elements, the second segment being a part of the first segment; and
generating, via the processing circuitry, a segment graph corresponding to the second record set,
wherein a range of an axis for the second element in the segment graph is determined based on second elements of the second record set and adjusted so as to include a maximum and a minimum among the second elements of the second record set.

10. The non-transitory computer readable medium according to claim 9, wherein
the circuitry is configured to generate an initial graph having the graph data including the plurality of records from which the first record set is specified, and
the segment graph is different from the initial graph.

* * * * *